United States Patent [19]

Umeda

[11] Patent Number: 5,198,633
[45] Date of Patent: Mar. 30, 1993

[54] STOPPER DEVICE IN A WELDING ROBOT GUN

[75] Inventor: Shigeru Umeda, Tokyo, Japan

[73] Assignee: Obara Corporation, Tokyo, Japan

[21] Appl. No.: 754,928

[22] Filed: Sep. 4, 1991

[30] Foreign Application Priority Data

Jan. 24, 1991 [JP] Japan .................................. 3-22576

[51] Int. Cl.[5] ........................ B23K 11/10; B23K 11/31
[52] U.S. Cl. .................................... 219/89; 219/86.25
[58] Field of Search ............... 219/89, 90, 86.25, 116, 219/86.21, 86.31, 86.24, 86.33, 86.41, 86.51, 86.61, 86.8; 901/42

[56] References Cited

U.S. PATENT DOCUMENTS

| | | | |
|---|---|---|---|
| 4,267,424 | 5/1981 | Shimatake et al. | 219/86.41 |
| 4,425,073 | 1/1984 | Mattsson | 219/86.24 |
| 4,517,435 | 5/1985 | Humblot | 219/89 |
| 4,831,228 | 5/1989 | Schumacher | 219/86.51 |
| 4,879,447 | 11/1989 | Umeda | 219/86.25 |
| 4,910,373 | 3/1990 | Fuse | 901/42 |
| 5,111,018 | 5/1992 | Nishiwaki et al. | 219/86.25 |

FOREIGN PATENT DOCUMENTS

| | | | |
|---|---|---|---|
| 112131 | 6/1984 | European Pat. Off. | 219/89 |
| 54-53461 | 4/1979 | Japan | 901/42 |
| 60-180683 | 9/1985 | Japan | 219/116 |
| 2083771 | 3/1982 | United Kingdom | 219/86.25 |

Primary Examiner—Geoffrey S. Evans
Attorney, Agent, or Firm—Flynn, Thiel, Boutell & Tanis

[57] ABSTRACT

A stopper device in a welding robot gun is capable of increasing the amount of movement of the upper arm and reducing the amount of movement of the lower arm or vice versa by adjusting the protruding amount of the stopper bolt from the rear wall of the stopper cylinder inside the stopper cylinder and of preventing the upper and lower arms from moving unstably from the state where the welding gun is open to the state where a pressure cylinder supplies fluid under pressure. The stopper device comprises a cradle, a stopper cylinder having a rod fixed to the cradle, a tip end of the rod connected to a rear end of the upper arm by way of a link wherein the stopper cylinder has a front chamber provided with a fluid supply and discharge port and a rear wall into which an adjustable stopper bolt is screwed so as to protrude deep or slight therefrom inside the stopper cylinder.

2 Claims, 2 Drawing Sheets

STOPPER DEVICE IN A WELDING ROBOT GUN

BACKGROUND OF THE INVENTION

1. Field of the Invention

The present invention relates to a stopper device in a welding robot X type gun.

2. Prior Art

A conventional stopper device in a welding robot X-type gun is illustrated in FIG. 4.

A lower arm 22 fixed to a pressure cylinder 21 and an upper arm 25 connected to the pressure cylinder 21 by way of a rod 23 are respectively pivotally mounted on a pivoting portion 27 disposed at a tip end of a cradle 26 attached to a robot, not shown.

Stopper bolts 29 and 30 are respectively attached to the upper and lower arms 25 and 22 and adjustably disposed in confronting relation relative to a stopper receiver 28 protruding from the cradle 26. When the rod 23 is drawn into the pressure cylinder 21, from the state as illustrated in FIG. 4, the tip end of the upper arm 25 moves upward so that the stopper bolt 29 of the arm 25 is brought into contact with the stopper receiver 28. When the rod 23 is further drawn into the pressure cylinder 21, the tip end of the lower arm 22 moves downward so that the stopper bolt 30 of the arm 22 is brought into contact with the stopper receiver 28 whereby both the upper and lower arms 25 and 22 are kept open where no welding operation is carried out.

However, the conventional stopper device has a problem that the amount of adjustment of the amount of movements of the upper and lower arms relative to the stopper receiver is limited since the stopper bolts are brought into contact with both surfaces of the stopper receiver while the stopper receiver disposed between the upper and lower arms moves unstably because of the weight of the welding gun from the state where the welding gun is kept open, i.e. non-welding state to the state where the pressure cylinder supplies fluid under pressure to the upper arm, i.e. welding state (hereinafter referred to as transient time).

SUMMARY OF THE INVENTION

The present invention is made to solve the problems set forth above and to provide a stopper device in a welding robot gun capable of increasing the amount of movement of the upper arm and reducing the amount of movement of the lower arm or vice versa by adjusting the protruding amount of the stopper bolt from the rear wall of the stopper cylinder inside the stopper cylinder and of assuring large stroke therebetween and of preventing the upper and lower arms of the welding gun from moving unstably at the transient time.

To achieve the above object, the stopper device in a welding robot gun comprises a cradle having a pivot portion provided at the tip end thereof, an upper arm pivotably mounted on said pivot portion and connected to a rod of a pressure cylinder by way of a link, a lower arm fixed to the pressure cylinder, a stopper cylinder having a cylinder rod provided at the tip end thereof and fixed to the cradle, a tip end of the cylinder rod being connected to a rear end of an upper arm by a link wherein the stopper cylinder has a front chamber provided with a supply and discharge port through which fluid under pressure is supplied into and discharged from the front chamber and a rear wall provided with an adjustable stopper bolt.

DESCRIPTION OF THE PREFERRED EMBODIMENT

Figure 1:
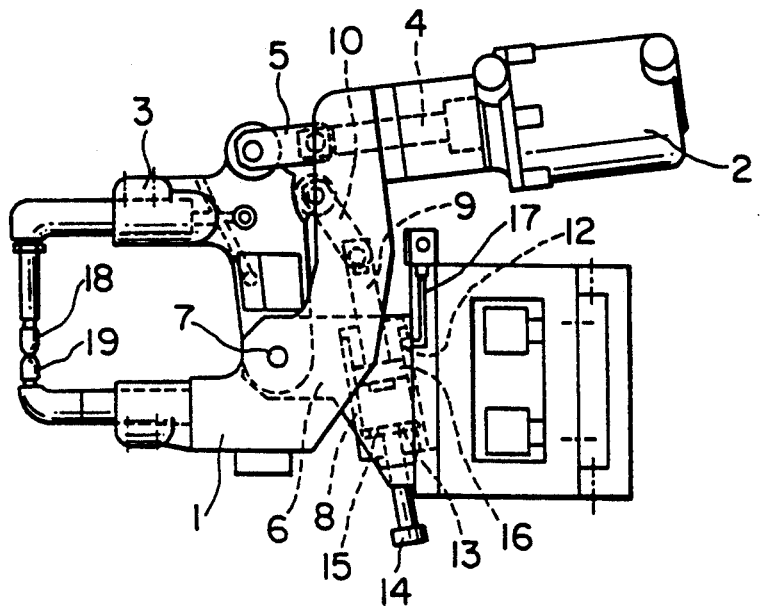
FIG. 1 is a side view of a stopper device in a welding robot gun according to a preferred embodiment of the present invention.

A stopper device in a welding robot gun comprises a pressure cylinder 2 having a rod 4, a lower arm 1 fixed to the pressure cylinder 2, an upper arm 3 connected to the rod 4 of the pressure cylinder 2 by way of a link 5 and a cradle 6 attached to a robot, not shown, and having a pivoting portion 7 on which the upper and lower arms 3 and 1 are pivotally mounted so as to turn freely.

A stopper cylinder 8 is fixed to the cradle 6 and has a rod 9, a tip end of which is connected to a rear end of the upper arm 3 by way of a link 10.

The stopper cylinder 8 has a front chamber 11 provided with a supply and discharge port 12 through which fluid under pressure is supplied into and discharged from the front chamber 11 and a rear wall 13 provided with a stopper bolt 14 which is adjustably screwed thereinto.

The rear wall 13 of the stopper cylinder 8 has a a hole 15 through which air is released. Air in a rear chamber of the stopper cylinder 8 is released from the hole 15 when fluid under pressure is supplied into the front chamber 11, while the cylinder 8 is kept free when fluid under pressure is discharged from the front chamber 11.

Designated at 16 is a piston of the stopper cylinder 8, 17 is a fluid conduit extending to the supply and discharge port 12, 18 is a first electrode fixed to the tip end of the upper arm 3 and 19 is a second electrode fixed to the tip end of the lower arm 1.

The operation of the stopper device in the welding robot gun will be described hereafter.

Figure 2:
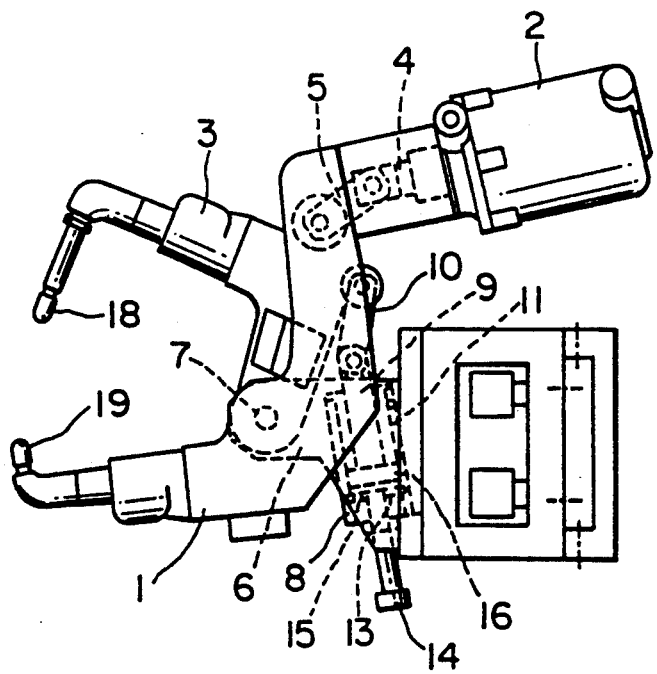
FIG. 2 is a side view of the stopper device in a welding robot gun when the same gun is kept open.

When the stopper bolt 14 extends a short distance into the stopper cylinder 8, the tip end of the upper arm 3 moves upward if the rod 4 is drawn into the pressure cylinder 2 from the state as illustrated in FIG. 1 and fluid under pressure is supplied into the front chamber 11 of the stopper cylinder 8. When the operation is continued and the piston 16 of the stopper cylinder 8 is brought into contact with the bolt 14, the upward movement of the upper arm 3 is interrupted. If the rod 4 is further drawn into the pressure cylinder 2, the tip end of the lower arm moves downward. When the rod 4 is stopped being drawn into the pressure cylinder 2, both the upper and lower arms 3 and 1 are kept open, namely, the welding operation is not effected as illustrated in FIG. 2.

Figure 3:
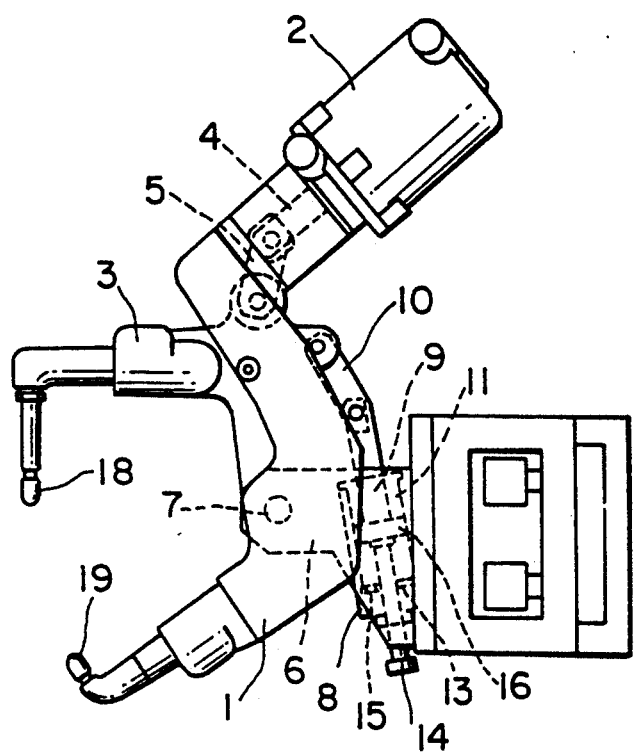
FIG. 3 is a side view of the stopper device in a welding robot gun when the same gun is kept open and a stopper bolt is inserted into an innermost of the cylinder.
Figure 4:
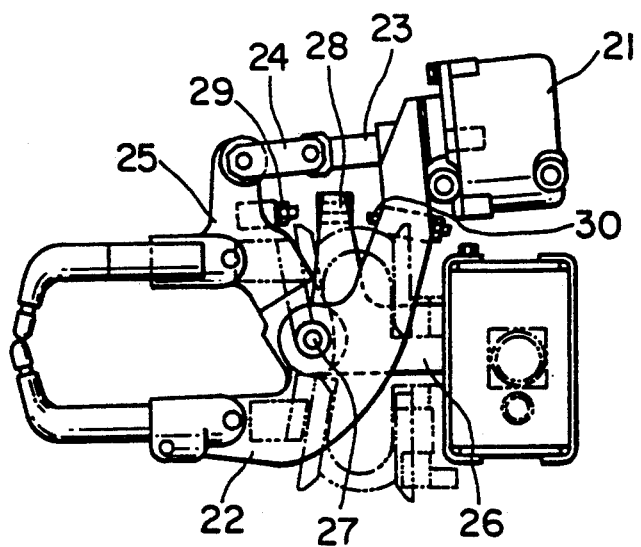
FIG. 4 is a side view of a conventional stopper device in a welding robot gun.

The stroke between the electrodes 18 and 19 at the state where both the upper and lower arms 3 and 1 are kept open is determined by the position of the stopper bolt 14. That is, when the stopper bolt 14 is screwed into the rear wall 13 of the stopper cylinder 8 so as to protrude a short distance from the rear wall 13 of the stopper cylinder 8 inside the stopper cylinder 8 as shown in FIG. 2, a long spacing exists between the piston 16 of the stopper cylinder 8 and the stopper bolt 14 with which the piston 16 is brought into contact so that the upper arm 3 moves upward to a large extent and the lower arm 1 moves downward to a small extent. On the other hand, when the stopper bolt 14 is screwed so as to protrude a long distance from the rear wall 13 of the stopper cylinder 8 inside the stopper cylinder 1 a short distance exists between the piston 16 of the stopper cylinder 8 and the stopper bolt 14 with which the piston 16 is brought into contact so that the upper arm 3 moves upward to a small extent and the lower arm 1 moves downward to a large extent. When the welding gun is moved from the state where it is kept open, as illustrated in FIG. 2 or 3, to the state where fluid under pressure is supplied into the pressure cylinder 2, the tip end of the upper arm 3 moves downward since the rod 4 is pushed by the pressure cylinder 2 and fluid under pressure in the front chamber 11 of the stopper cylinder 8 is discharged therefrom whereby the piston 16 of the stopper cylinder 8 is brought into contact with the front wall of the cylinder or the electrode 19 contacts the work to be welded. At this time, the movement of the upper arm 3 is stopped while the tip end of the lower arm 1 starts to move upward. When the rod 4 is extended to a given position, the pressure cylinder 2 supplies fluid under pressure into the upper arm 3.

With the arrangement set forth above, it is possible to expand and contract arbitrarily the stroke between the upper and lower arms by adjusting the position of the stopper bolt.

Furthermore, the stroke can be expanded with assurance since the stopper receiver is not provided between the upper and lower arms as made in the conventional stopper device.

Still furthermore, when the welding gun is moved from the state where the upper and lower arms are kept open to the state where the pressure cylinder supplies fluid under pressure into the upper arm, the upper arm is restricted to move by fluid under pressure while the lower arm is restricted to move by the piston of the stopper cylinder whereby the stable motion caused by the weight of the welding gun at the transient time is prevented so that the stable welding operation can be made.

What is claimed is:

1. A welding gun adapted to be attached to a robot, comprising:
   a cradle having a mounting portion adapted to be connected to a robot and a tip end having a pivot portion thereon;
   an upper arm pivotably mounted on said pivot portion, said upper arm having a first welding electrode at a forward end thereof;
   a pressure cylinder having a housing, a first piston longitudinally slidable in said housing and a first piston rod connected to said first piston for movement therewith and projecting forwardly from said housing in a direction toward said first welding electrode, a first link pivotably connected to and extending between a forward end of said first rod and said upper arm;
   a lower arm pivotably mounted on said pivot portion at a location between forward and rearward ends thereof, the rearward end of said lower arm being fixedly connected with said housing of said pressure cylinder and the forward end of said lower arm having a second welding electrode thereon, said first and second welding electrodes being generally opposed to each other so that workpieces to be welded can be clamped therebetween; and
   a stopper cylinder fixedly connected to said cradle, said stopper cylinder having a second piston linearly longitudinally slidable therein and dividing the interior of said stopper cylinder into a front chamber and a lower chamber, said lower chamber having a bottom wall, a second rod connected to said second piston for movement therewith and extending upwardly through said front chamber; a second link pivotably connected to and extending between an upper end of said second rod and said upper arm at a location on said upper arm which is rearwardly of the pivotable connection of said first link to said upper arm, said stopper cylinder having a port communicating with said front chamber so that pressure fluid can be supplied to and discharged from said front chamber, and a vertically adjustable stopper bolt extending upwardly through said bottom wall into said lower chamber and adapted to abut against said second piston to limit downward movement of said second piston in said stopper cylinder.

2. A welding gun comprising a cradle adapted to be attached to a robot, a pair of arms pivotably mounted on said cradle for pivoting movement about a first axis and having opposed welding electrodes at corresponding ends thereof, a pressure cylinder for pivoting said arms with respect to said cradle, a stopper cylinder fixed to said cradle, a piston linearly longitudinally slidable in said stopper cylinder and dividing same into first and second chambers, a rod connected to said piston for movement therewith and projecting from said first chamber of said stopper cylinder toward one of said arms, a link pivotably connected to and extending between said rod and said one arm so that linear movement of said piston will effect pivotal movement of said one arm about said first axis, said stopper cylinder having a port communicating with said first chamber so that pressure fluid can be supplied to and discharged from said first chamber, and an adjustable stop in said second chamber for engaging said piston and preventing further movement of said piston in one direction.

* * * * *